(12) United States Patent
Klees et al.

(10) Patent No.: US 7,441,437 B2
(45) Date of Patent: Oct. 28, 2008

(54) CALIBRATION RIG

(75) Inventors: Daniel Klees, Greenwood, IN (US); David Coppa, Charlotte, NC (US); Ola Wesstrom, Greenwood, IN (US)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/687,094

(22) Filed: Oct. 17, 2003

(65) Prior Publication Data
US 2004/0118179 A1  Jun. 24, 2004

(51) Int. Cl.
G01F 25/00 (2006.01)

(52) U.S. Cl. .......................... 73/1.16; 73/1.33
(58) Field of Classification Search .......... 73/1.16–1.36
See application file for complete search history.

(56) References Cited

U.S. PATENT DOCUMENTS

| | | | | |
|---|---|---|---|---|
| 3,403,544 A | * | 10/1968 | Francisco, Jr. ............... 73/1.21 |
| 3,940,971 A | * | 3/1976 | Krause et al. ................ 73/1.27 |
| 4,594,154 A | * | 6/1986 | Bissardon et al. ........... 210/105 |
| 4,671,097 A | * | 6/1987 | Kurki et al. .................. 73/1.34 |
| 4,962,666 A | * | 10/1990 | Adney et al. .................. 73/223 |
| 4,989,446 A | * | 2/1991 | Conti ......................... 73/1.16 |
| 5,170,656 A | * | 12/1992 | Draus ......................... 73/1.22 |
| 5,526,674 A | * | 6/1996 | Korpi ......................... 73/1.21 |
| 6,360,579 B1 | * | 3/2002 | De Boom et al. ............ 73/1.35 |
| 6,952,937 B2 | * | 10/2005 | Choi et al. .................... 62/347 |
| 2003/0188746 A1 | * | 10/2003 | Daugherty ............. 128/203.12 |

* cited by examiner

Primary Examiner—Robert R Raevis
(74) Attorney, Agent, or Firm—Bacon & Thomas, PLLC

(57) ABSTRACT

A calibration rig for calibration and/or re-calibration of flow meters (5) and/or flow meter calibration carts (7) is described comprising: a source (1) of pure sterilized water or a source (40) of a sterile conductive solution, a piping manifold (3) connected to the source (1), at least one flow meter (5) connected to the source (1) via the piping manifold (3) and/or at least one flow meter calibration cart (7) connected to the source (1) via the piping manifold (3) and a drain pipe (23) connected to each flow meter (5) and to each flow meter calibration cart (7) to guide liquid from the flow meter (5) and/or the flow meter calibration cart (7) to a drain (23).

3 Claims, 1 Drawing Sheet

CALIBRATION RIG

BACKGROUND AND SUMMARY OF THE INVENTION

The present invention relates to calibration rigs for calibration and/or re-calibration of flow meters and flow meter calibration carts.

Flow meters are commonly used devices for measuring a flow of a liquid through a pipe. In various branches of industry, for example in the chemical industry or in the pharmaceutical industry, the measurement data obtained by flow meters is used to control complex industrial processes. Exact measurements of the flow are very important. Therefore flow meters are carefully calibrated before they are first installed. Also regular re-calibration is performed in order to ensure high accuracy of measurements over long periods of time.

Flow meters are currently calibrated on flow meter calibration rigs comprising a large reservoir of treated city water. The water is circulated through the flow meter to be calibrated and then to a diverter. The diverter either diverts the water back to the reservoir or to a weigh tank. The weigh tank is used to determine a quantity of water it obtained from the flow meter and is then emptied into the reservoir. The water supply in the reservoir is reused on the rig many times. The water reservoir is completely emptied, cleaned and refilled typically only once a year.

Problems can occur, when used flow meters are re-calibrated in this way. Even if all flow meters have been cleaned and decontaminated before re-calibration, it can not be guaranteed that they are absolutely free of all hazardous contaminates. First of all it is very difficult to determine all contaminants the flow meter has been exposed to and secondly substances that are considered harmless by most users may very well be considered a dangerous contaminant in another industry. An example for this are proteins. Whereas most industries do not consider proteins to be contaminants, they can very well be contaminants in a biological or pharmaceutical process.

A potentially contaminated flow meter can thus contaminate the water. This contaminated water can then become a potential source of contamination of flow meters that are calibrated or re-calibrated on the rig later on.

The same problems occur when flow meter calibration carts are calibrated and/or re-calibrated. Flow meter calibration carts are mobile units designed for on site calibration or re-calibration of flow meters. They comprise a flow meter that is designed to perform a reference measurement of a flow on site. Data from this reference measurement is used for calibration and/or re-calibration of the flow meter on the site. During the process of calibration or re-calibration the flow meter calibration cart is either installed in a pipe leading up to the flow meter to be calibrated or re-calibrated or it is installed in parallel to the flow meter. In the first case the flow through the flow meter calibration cart and the flow through the flow meter are identical. In the second case the flow through the flow meter corresponds to the flow through the flow meter calibration cart multiplied by a constant. The value of the constant depends on the mechanical and geometrical features of the calibration or re-calibration set up.

The flow meter to be calibrated or re-calibrated can remain on its position during the entire calibration procedure.

The flow meter inside the mobile flow meter calibration cart needs to operate with a high accuracy and reliability. Therefore flow meter calibration carts have to be calibrated and regularly re-calibrated, using calibration rigs. Consequently flow meter calibration carts are exposed to the same risks of contamination as flow meters.

It is an object of the invention to provide a flow meter calibration rig, that can be used for calibration and/or re-calibration of flow meters and/or flow meter calibration carts.

To this end the invention comprises a calibration rig comprising:
- a source of pure sterilized water or a source of a sterile conductive solution,
- a piping manifold connected to the source,
- at least one flow meter connected to the source via the piping manifold and/or
- at least one flow meter calibration cart connected to the source via the piping manifold and
- a drain pipe connected to each flow meter and to each flow meter calibration cart to guide liquids from the flow meters and/or the flow meter calibration carts to a drain.

According to a refinement of the invention, a calibrated reference flow meter is installed in parallel or alternatively in series to a flow meter or a flow meter calibration cart to be calibrated or re-calibrated.

According to a refinement of the invention a device for measuring a quantity of liquid received from a flow meter or a flow meter calibration cart is installed between the flow meter or the flow meter calibration cart and the drain pipe. Preferably the device for measuring a quantity of liquid is a weigh tank.

According to another refinement of the invention a device for supplying a predetermined quantity of liquid is installed between the source and the flow meter or the flow meter calibration cart.

Further the invention comprises a method of calibration or re-calibration of a flow meter or a flow meter calibration cart, comprising the steps of
- mounting the flow meter or the flow meter calibration cart on a flow meter calibration rig according to the invention,
- sending a quantity of pure sterilized water through the flow meter or the flow meter calibration cart,
- directing the water from the flow meter or the flow meter calibration cart to a drain.

Further the invention comprises a method of calibration or re-calibration of a flow meter, comprising the steps of
- mounting the flow meter on a flow meter calibration rig according to one of the previous claims comprising a source of pure sterilized water,
- adding a quantity of a sterile conductive solution to the pure sterilized water thus obtaining a sterile conductive liquid,
- sending this sterile conductive liquid through the flow meter, and
- directing the sterile conductive liquid from the flow meter to a drain.

One advantage of the calibration rig is that even if calibration or re-calibration of contaminated flow meters or flow meter calibration carts is performed a contamination of the rig cannot occur. Thus subsequently calibrated or re-calibrated devices cannot become contaminated.

Since the liquid is sterile and never resupplied to the rig a decontamination of flow meters or flow meter calibration carts is no longer necessary prior to re-calibration.

The invention and further advantages are explained in more detail using the figure of the drawing, in which one exemplary embodiment is shown.

DETAILED DESCRIPTION OF THE DRAWINGS

Figure 1:
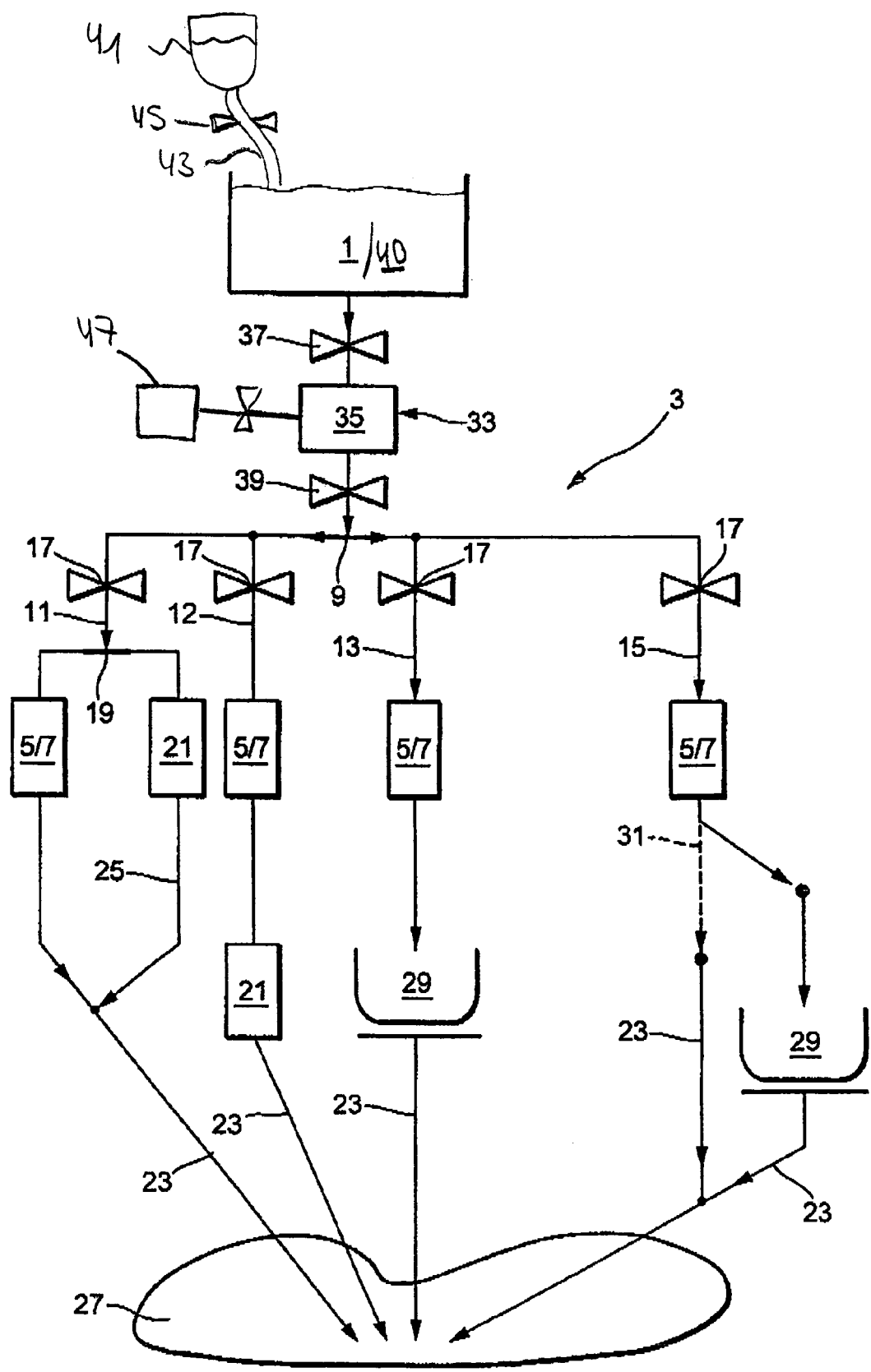
FIG. 1 shows a schematic diagram of calibration rig according to the invention.

FIG. 1 shows a schematic diagram of a calibration rig according to the invention. It comprises a source 1 of pure sterilized water. Extremely pure sterilized water is for example known as water for injection and is commonly available, for example from a Water for Injection (WFI) system. The source can be a container or vessel of any kind that is capable of holding large quantities of a liquid, for example several thousand or even hundred thousand liters.

A piping manifold 3 is connected to the source 1. The piping manifold 3 comprises at least one connector designed for connecting a flow meter 5 or a flow meter calibration cart 7 to the source 1. Calibration or re-calibration is performed by the method of mounting the flow meter 5 or the flow meter calibration cart 7 on a flow meter calibration rig according to the invention. In a next step pure sterilized water is send from the source 1 through the flow meter 5 or the flow meter calibration cart 7 and is finally left to drain before or after measuring its exact quantity. Pure sterilized water contains no contaminants of any kind. It cannot contaminate the devices that are calibrated or re-calibrated using the calibration rig. The liquid is always left to drain and never re-used for calibration or re-calibration purposes. Consequently even contaminated flow meters 5 or flow meter calibration carts 7 cannot cause contamination of subsequently calibrated or re-calibrated devices. Even if contaminants dissolve in the water they will always be guided downstream of devices to be calibrated or re-calibrated in the future.

In the embodiment shown in FIG. 1 the piping manifold 3 comprises a diverter 9 that links the source 1 to one or more pipes 11, 12, 13, 15. Valves 17 are foreseen at an end of each pipe 11, 12, 13, 15 near the diverter 9. By opening and closing the individual valves 17 a flow of water is directed into one or more of the pipes 11, 12, 13, 15. In the embodiment shown, a first pipe 11, a second pipe 12, a third pipe 13 and a fourth pipe 15 are connected to the diverter 9.

The first pipe 11 leads up to a t-junction 19. A flow meter 5 or a flow meter calibration cart 7 to be calibrated or re-calibrated is connected to one end of the t-junction. A calibrated reference flow meter 21 is connected to an other end of the t-junction 19. Water from the source is directed through the pipe 11 and the t-junction 19 and fed through the flow meter 5 or the flow meter calibration cart 7 and through the calibrated reference flow meter 21.

For calibration or re-calibration purposes the calibrated reference flow meter 21 is installed in parallel to the flow meter 5 or the flow meter calibration cart 7 to be calibrated or re-calibrated. It measures the flow through the calibrated reference flow meter 21. Data obtained from this measurement is then used to calibrate or re-calibrate the flow meter 5 or the flow meter calibration cart 7 installed parallel to the calibrated reference flow meter 21. The flow through the calibrated reference flow meter 21 is equal to the flow through the flow meter 5 or the flow meter calibration cart 7 multiplied by a constant. That constant is determined by the mechanical and geometrical properties of the calibration rig, the calibrated reference flow meter 21 and the flow meter 5 or the flow meter calibration cart 7 to be calibrated or re-calibrated. It can be determined experimentally.

A drain pipe 23 is connected to the flow meter 5 or the flow meter calibration cart 7. A drain pipe 25 is connected to the calibrated reference flow meter 21. The drain pipes 23, 25 guide the water from the flow meter 5 or the flow meter calibration cart 7 and from the calibrated reference flow meter 21 to a drain 27.

The second pipe 12 leads up to a flow meter 5 or a flow meter calibration cart 7. Downstream of the flow meter 5 or the flow meter calibration cart 7 a calibrated reference flow meter 21 is installed in series to the flow meter 5 or the flow meter calibration cart 7 to be calibrated or re-calibrated. Thus the flow through the reference flow meter 21 is equal to the flow through the flow meter 5 or the flow meter calibration cart 7 and is used for the calibration or re-calibration. A drain pipe 23 is connected to the reference flow meter 21 directing the liquid supplied by the source 1 to the flow meter 5 or the flow meter calibration cart 7 to the drain 27.

It is also possible to install the reference flow meter 21 upstream of a device to be calibrated or re-calibrated.

A flow meter 5 or alternatively a flow meter calibration cart 7 is connected to the third pipe 13. Again a drain pipe 23 is connected to the flow meter 5 or the flow meter calibration cart 7, directing the liquid supplied by the source 1 from the flow meter 5 or alternatively the flow meter calibration cart 7 to the drain 27.

Here a device 29 for measuring a quantity of liquid received from the flow meter 5 or the flow meter calibration cart 7 is installed between the flow meter 5 or the flow meter calibration cart 7 and the drain pipe 23. One example of such a device 29 is a weigh tank. A weigh tank measures the weight of a medium it contains. By measuring the weight of the liquid that flowed through the flow meter 5 or the flow meter calibration cart 7 into the weigh tank and the time needed for the liquid to flow through the flow meter 5 or the flow meter calibration cart 7 an average flow can be calculated and applied in the calibration or re-calibration process.

Yet another calibration set-up is shown which is connected up to the fourth pipe 15. A flow meter 5 or alternatively a flow meter calibration cart 7 is connected to the fourth pipe 15. Again a drain pipe 23 is connected to the flow meter 5 or the flow meter calibration cart 7, directing the liquid supplied by the source 1 from the flow meter 5 or alternatively the flow meter calibration cart 7 to the drain 27.

Downstream of the flow meter 5 or the flow meter calibration cart 7 a diverter 31 is foreseen. The diverter 31 can either be set to form a direct connection to the drain pipe 23 or it can be set to direct the liquid to a device 29 for measuring a quantity of liquid received from the flow meter 5 or the flow meter calibration cart 7, which in turn is connected to the drain pipe 23. The device 29 shown is a weigh tank, that can be used for calibration or re-calibration as previously explained.

In a setting where the diverter 31 connects the flow meter 5 or the flow meter calibration rig 7 up to the drain pipe 23, the flow through the flow meter 5 or the flow meter calibration rig 7 can be determined by measuring the time it takes for a predetermined quantity of water to go through. Preferably a device 33 for supplying a predetermined quantity of liquid is installed between the source 1 and the flow meter 5 or the flow meter calibration cart 7 respectively. In FIG. 1 the device 33 comprises a container 35 with an accurately known inner volume that can be filled by the source 1 and drained completely into the fourth pipe 15. Filling and draining of the container is controlled by a first valve 37 located immediately upstream of the container 35 and a second valve 39 located immediately downstream of the container 35.

Whenever the device 33 is not needed, the first and the second valve 37, 39 can be opened completely, allowing the liquid from the source 1 to flow trough. Preferably the device 33 is positioned upstream of the diverter 9, in order to allow use of the device 33 in combination with any of the calibration set-ups foreseen on the rig.

Calibration set-ups as the ones connected to the first, the second, the third and the fourth pipe 11, 12, 13, 15 form examples for such set-ups. A calibration rig according to the invention can comprise any number each of these set-ups or even modifications thereof as long as only pure sterilized water enters the devices to be calibrated or re-calibrated and is left to drain once it has been directed through a device to be calibrated.

Whereas most types of flow meters-can determine the flow of pure sterilized water, some flow meters require a liquid to be conductive in order to measure its flow. One example of the later are magnetic flow meters. In magnetic flow meters a magnetic field is applied to the flowing liquid. Electrodes are exposed to the liquid and are used to determine a voltage induced by the flow of a conductive liquid through the magnetic field. For most flow meters of this type, a conductivity of more than 5 Micro-Siemens is sufficient.

Whenever a conductive liquid is needed, a rig identical to the one described above can be equipped with a source 40 of a sterile conductive solution, replacing the source 1 of the pure sterilized water. The sterile conductive solution can be a saline solution, for example Potassium Chloride or Sodium Chloride or another sterile ionic solution.

This can be done, by adding the sterile conductive solution directly to the pure sterilized water in the source. FIG. 1 shows a container 41 which is mounted above the source. It is filled with a sterile conductive solution and connected to the source via a pipe 43. A valve 45 is foreseen between the container 41 and the source 1. The valve 45 can be opened in order to allow the sterile conductive solution to enter the source 1.

The sources 1, 40 contain a large quantity of liquid. To allow more flexibility of the use of the calibration rig, it is also feasible to maintain the source 1 of pure sterilized water on the rig and to add a sterile conductive solution to the pure sterilized water downstream of the source.

For calibration or re-calibration of flow meters 5, that require a liquid to be conductive in order to measure its flow, the following method can be applied, wherein the flow meter 5 is mounted on a flow meter calibration rig according to the invention comprising a source 1 of pure sterilized water.

In order to make the liquid sufficiently conductive, a quantity of a sterile conductive solution is added to the pure sterilized water. The sterile conductive solution dissolves in the pure sterilized water. Thus a sterile conductive liquid is obtained.

One method of adding the sterile conductive solution to the pure sterilize water makes use of a dispenser 47, which is designed to dispense a defined quantity of sterile conductive solution. The dispenser 47 can be linked to the source 1 or it can be linked to the container 35 of the device 33, as shown in FIG. 1. Linking the dispenser 47 to the container 35 has the advantage that a defined quantity of sterile conductive solution will dissolve in a defined quantity of pure sterilized water, which results in a quantity of liquid, which is small compared to the amount of liquid contained in the source 1. The resulting liquid in the container 35 has a defined conductivity.

After the sterile saline solution was added to the pure sterilized water it dissolves in it and the resulting liquid is send through the flow meter 5. Finally the liquid will be directed from the flow meter 5 to the drain 23.

What is claimed is:

1. A calibration rig for calibration and/or re-calibration of flow meters, comprising:
    a source of pure sterilized water;
    a drain;
    at least one flow meter connected to said source and to said drain;
    a calibration reference flow meter installed in one of: parallel or series arrangement to said at least one flow meter to be calibrated or re-calibrated; and
    a drain pipe connecting said flow meter and said calibration reference flow meter to said drain.

2. The calibration rig according to claim 1, further comprising:
    a device for supplying a predetermined quantity of water, said device being installed between said source and said at least one flow meter.

3. A method of calibration or re-calibration of at least one flow meter on a flow meter calibration rig, the flow meter calibration rig comprising:
    a source of pure sterilized water; a calibration reference flow meter; and a drain; said method comprising the steps of:
    Installing said at least one flow meter to be calibrated or re-calibrated in one of parallel and series arrangement to said calibrated reference flow meter on the calibration rig;
    sending pure sterilized water from the source through the flow meter and the calibrated reference flow meter; and
    directing all the water that has been sent through said flow meter and said calibrated reference flow meter to the drain.

\* \* \* \* \*